United States Patent
Lee et al.

(10) Patent No.: US 7,797,715 B2
(45) Date of Patent: Sep. 14, 2010

(54) METHOD OF PROVIDING USER INFORMATION-BASED SEARCH USING GET_DATA OPERATION IN TV ANYTIME METADATA SERVICE

(75) Inventors: Jong Sul Lee, Seongnam (KR); Seok Pil Lee, Sungnam (KR)

(73) Assignee: Korea Electronics Technology Institute, Sungnam-si (KR)

( * ) Notice: Subject to any disclaimer, the term of this patent is extended or adjusted under 35 U.S.C. 154(b) by 347 days.

(21) Appl. No.: 11/588,207

(22) Filed: Oct. 27, 2006

(65) Prior Publication Data
US 2007/0106648 A1 May 10, 2007

(30) Foreign Application Priority Data
Nov. 8, 2005 (KR) .................. 10-2005-0106591

(51) Int. Cl.
*G06F 3/00* (2006.01)
*H04N 7/16* (2006.01)
*H04N 7/00* (2006.01)
*G06Q 30/00* (2006.01)
*G06F 15/16* (2006.01)

(52) U.S. Cl. .................. 725/53; 725/135; 348/844; 705/14.54; 705/14.55; 715/760; 709/217; 719/313; 719/330

(58) Field of Classification Search .................. 725/53, 725/135; 348/844; 705/14.54, 14.55; 715/760; 709/217; 719/313, 330

See application file for complete search history.

(56) References Cited

U.S. PATENT DOCUMENTS

| | | | |
|---|---|---|---|
| 6,356,753 B1 * | 3/2002 | Kolev et al. | 455/411 |
| 2003/0151621 A1 * | 8/2003 | McEvilly et al. | 345/744 |
| 2004/0208480 A1 * | 10/2004 | Yoon et al. | 386/69 |
| 2004/0210572 A1 * | 10/2004 | Shin | 707/3 |
| 2005/0125683 A1 * | 6/2005 | Matsuyama et al. | 713/189 |
| 2005/0144285 A1 * | 6/2005 | Hickman | 709/227 |

FOREIGN PATENT DOCUMENTS

KR 1020050053225 A 6/2005

OTHER PUBLICATIONS

ETSI, ETSI TS 102 822-6-1 V1.1.1 Technical Specification—Broadcast and On-line Services: Search, select, and rightful use of content on personal storage systems (TV-Anytime Phase 1); Part 6:Delivery of metadata over a bi-directional network, Oct. 2003.*

* cited by examiner

*Primary Examiner*—Hoang-Vu A Nguyen-Ba
(74) *Attorney, Agent, or Firm*—Sughrue Mion, PLLC

(57) ABSTRACT

The present invention provides a method of providing a user information-based search using a get_Data operation in TV-ANYTIME service. In the user information-based search provision method of the present invention, a user information (PersonalInformation) element is added as an element of the get_Data operation. A request message of the get_Data operation is received. User information is extracted from the user information (PersonalInformation) element in response to reception of the request message. A user information-based search is conducted using the extracted user information. Results of the user information-based search are transmitted using a response message of the get_Data operation. Accordingly, the present invention is advantageous in that a client provides user information to a service provider using a get_Data operation, and the service provider can search for contents suitable for each user in consideration of the user information.

1 Claim, 5 Drawing Sheets

```
<element name="get_Data" type="tns:get_DataType"/>
<complexType name="get_DataType">
  <sequence>
    <element name="ResourceID" type="disco:ResourceIDType" minOccurs="0"/>
    <element name="QueryConstraints">
      <complexType>
        <choice>
          <element name="PredicateBag" type="tns:PredicateBagType"/>
          <element name="BinaryPredicate" type="tns:BinaryPredicateType"/>
          <element name="UnaryPredicate" type="tns:UnaryPredicateType"/>
        </choice>
      </complexType>
    </element>
    <element name="PersonalInformation" type="tva2:ExtendedUserDescriptionType"
             minOccurs="0"/>
  </sequence>
  <attribute name="maxPrograms" type="unsignedInt"/>
  <attribute name="personalInfoUse" type="boolean" default="true"/>
</complexType>
```

Fig. 3 (RELATED ART)

```
<element name="get_Data" type="tns:get_Data"/>
 <complexType name="get_Data">
    <sequence>
      <element name="QueryConstraints">
        <complexType>
          <choice>
            <element name="PredicateBag" type="tns:PredicateBagType"/>
            <element name="BinaryPredicate" type="tns:BinaryPredicateType"/>
            <element name="UnaryPredicate" type="tns:UnaryPredicateType"/>
          </choice>
        </complexType>
      </element>
      <element name="RequestedTables" type="tns:RequestedTablesType"/>
    </sequence>
    <attribute name="maxPrograms" type="unsignedInt"/>
 </complexType>
```

Fig. 4 (RELATED ART)

```
<element name="get_Data" type="tns:get_Data"/>
  <complexType name="get_Data">
    <sequence>
      <element name="QueryConstraints">
        <complexType>
          <choice>
            <element name="PredicateBag" type="tns:PredicateBagType"/>
            <element name="BinaryPredicate" type="tns:BinaryPredicateType"/>
            <element name="UnaryPredicate" type="tns:UnaryPredicateType"/>
          </choice>
        </complexType>
      </element>
      <element name="RequestedTables" type="tns:RequestedTablesType"/>
    </sequence>
    <attribute name="maxPrograms" type="unsignedInt"/>
  </complexType>
<   <complexType name="RequestedTablesType">
    <sequence>
      <element name="Table" maxOccurs="unbounded">
        <complexType>
          <sequence>
            <element name="SortCriteria" type="tns:SortCriteriaType" minOccurs="0" maxOccurs="unbounded"/>
<         </sequence>
          <attribute name="type" use="required">
            <simpleType>
              <restriction base="string">
<               <enumeration value="ContentReferencingTable"/>
<               <enumeration value="ClassificationSchemeTable"/>
<               <enumeration value="ProgramInformationTable"/>
<               <enumeration value="GroupInformationTable"/>
<               <enumeration value="CreditsInformationTable"/>
<               <enumeration value="ProgramLocationTable"/>
<               <enumeration value="ServiceInformationTable"/>
<               <enumeration value="ProgramReviewTable"/>
<               <enumeration value="SegmentInformationTable"/>
<             </restriction>
<           </simpleType>
          </attribute>
        </complexType>
      </element>
    </sequence>
  </complexType>
```

Fig. 5 (RELATED ART)

```
<element name="get_Data_Result" type="tns:get_Data_ResultType"/>
  <complexType name="get_Data_ResultType">
    <sequence>
      <element name="TableSortingInformation"
               type="tns:RequestedTablesType" minOccurs="0"/>
      <element ref="tva:TVAMain" minOccurs="0"/>
      <element ref="cr:ContentReferencingTable" minOccurs="0"/>
      <element name="InvalidFragments"
               type="tns:InvalidFragmentsType" minOccurs="0"/>
    </sequence>
    <attribute name="serviceVersion" type="unsignedInt" use="required"/>
    <attribute name="truncated" type="boolean"/>
```

Fig. 6 (RELATED ART)

```
<element name="submit_Data" type="tns:submit_Data"/>
    <complexType name="submit_Data">
        <sequence>
            <element name="UserDescription" maxOccurs="unbonded"/>
        </sequence>
    </complexType>
<!-- ############ Section 5.2.2 submit_Data output ############ -->
<element name="submit_Data_Result" type="tns:submit_Data_Result"/>
<complexType name="submit_Data_Result">
        <attribute name="serviceVersion" type="unsignedInt" use="required"/>
</complexType>
```

Fig. 7

```
<element name="get_Data" type="tns:get_DataType"/>
<complexType name="get_DataType">
  <sequence>
    <element name="ResourceID" type="disco:ResourceIDType" minOccurs="0"/>
    <element name="QueryConstraints">
      <complexType>
        <choice>
          <element name="PredicateBag" type="tns:PredicateBagType"/>
          <element name="BinaryPredicate" type="tns:BinaryPredicateType"/>
          <element name="UnaryPredicate" type="tns:UnaryPredicateType"/>
        </choice>
      </complexType>
    </element>
    <element name="PersonalInformation" type="tva2:ExtendedUserDescriptionType"
         minOccurs="0"/>
  </sequence>
  <attribute name="maxPrograms" type="unsignedInt"/>
  <attribute name="personalInfoUse" type="boolean" default="true"/>
</complexType>
```

Fig. 8

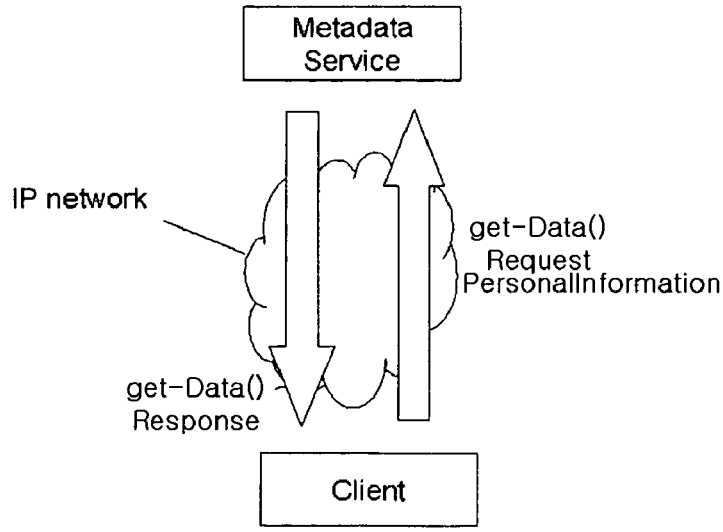

METHOD OF PROVIDING USER INFORMATION-BASED SEARCH USING GET_DATA OPERATION IN TV ANYTIME METADATA SERVICE

RELATED APPLICATIONS

The present disclosure relates to subject matter contained in priority Korean Application No. 10-2005-0106591 filed on 8 Nov. 2005, which is herein expressly incorporated by reference in its entirety.

BACKGROUND OF THE INVENTION

1. Field of the Invention

The present invention relates, in general, to TV-ANYTIME service and, more particularly, to a method of searching for metadata based on user information transmitted using a get_Data operation.

2. Description of the Related Art

Recently, as a digital broadcasting service has become popularized, research into technology for providing a customized broadcasting service in a multichannel multimedia environment has been actively carried out. For example, TV-ANYTIME, which is a nonofficial international standard, is a standard for providing an anytime service of allowing a user to match his or her preferences with metadata on the basis of the metadata including description information of contents, to store desired contents, and to freely watch desired broadcast contents at any time.

As described above, metadata, which is description information about contents, includes content-based description information defined in Moving Picture Experts Group (MPEG)-7 and Electronic Program Guide (EPG) information in TV-ANYTIME service, and allows a user to easily search for and select desired contents. The metadata standard is composed of two parts. Part A defines a format for representing metadata, that is, a schema, and utilizes extensible Markup Language (XML)-based MPEG-7 Description Definition Language (DDL) (International Organization for Standardization (ISO)/International Electrotechnical Commission (IEC) 15938-2). Part B relates to the transmission of metadata and includes a binary format [MPEG-7 BiM: Binary Format for MPEG-7] (ISO/IEC 15938-1), a fragmentation model, an encapsulation mode and an indexing method.

FIG. 1 is a view showing the configuration of TV-ANYTIME metadata, which includes program description metadata and user description metadata. The program description metadata includes content description metadata and instance description metadata. Metadata for a single program are interrelated via a content identifier called a Content Reference Identifier (hereinafter referred to as a "CRID").

Content description metadata is created by a content creator and includes a program title, genre, summary, critic's reviews, etc. Instance description metadata is created by a content provider and includes location (broadcast time, channel, Uniform Resource Locator (URL), etc.), usage rule, delivery parameter, etc. User description metadata includes user preference, usage history, personal bookmarks, etc., and is created by a user.

TV-ANYTIME standards define two-types of metadata Web services for bi-directional metadata services using a return path: one is a well-defined behavior and the other is a remote procedure for an input/output set. In extensible Markup Language (XML)-based Web Service Description Language (WSDL) standards, the above-described remote procedure is defined in the form of a Simple Object Access Protocol (hereinafter referred to as "SOAP") operation, and includes a "get_Data( )" operation used to search for metadata and a "submit_Data" operation used for user description submission. For reference, the above-described SOAP is an XML-based communication protocol enabling access to an object in a distribution environment.

Request/response types used in the TV-ANYTIME metadata service are defined in a namespace of "urn:tva:transport:2002", which is provided as a tool for verifying a variety of messages. Types defined in metadata specification and content referencing standards are referred to in a transport namespace. Schema fragments are defined by the above-described namespace, and a namespace provider is defined in the form of "tns:" in the schema fragments. A perfect XML schema file has a form of tva_transport_types_v10.xsd.

1. Get_Data( ) Operation

The get_Data( ) operation provides a function of allowing a client to search a server for TV-ANYTIME data about a program or a program group. Functions that can be provided by a TV-ANYTIME metadata provider using the get_Data( ) operation are exemplified by the following description.

return content reference data for CRID using CRID list
    return TV-ANYTIME metadata for CRID using CRID list
    receive query for specific metadata attributes (for example, genre, actor, etc.) and return programs corresponding to the query
    return corresponding programs in response to a query for a specific time or specific channel Referring to FIG. 2 in relation to the execution of a get_Data( ) operation, a client transmits a SOAP request message [get_Data( ) Request] using the get_Data( ) operation to a metadata service server through the Internet (Internet Protocol (IP) network). At this time, the get_Data( ) operation supports all types of queries as a rule, and provides extensive queries for metadata constraints. Then, the metadata service server returns a query result value corresponding to the SOAP request message using a SOAP response message [get_Data( ) Response].

a. Request Format

As shown in FIG. 3, a request format assigns three types of parameters to a client in the get_Data( ) operation, and assigns an element type, returned as a query (search) result value, to the type of RequestedTables.

FIG. 4 shows an example in which the RequestedTables type, returned as a query result, is assigned to Classification-Schemetable, ProgramInformationTable, GroupInformationTable, CreditsInformationTable, ProgramLocationTable, ServiceInformationTable, ProgramReviewTable, SegmentInformationTable, etc.

b. Response Format

As shown in FIG. 5, the response format of the get_Data( ) operation includes 0 or one or more XML instance documents with respect to elements, that is, TVAMain, ContentReferencingTable, and InvalidFragments, and returns a query result value according to the type of RequestedTables requested in the request format.

2. Submit_Data Operation

FIG. 6 is a view showing the request format and the response format of a submit_Data operation. The object of the submit_Data operation is to transmit only data from which a user's personal information has been excluded. That is, in TV-ANYTIME's phase I standard, the submit_Data operation is limited to data defined by a set of anonymous profile data created by intelligent agents based on a usage service and contents or by manual input. A TV-ANYTIME forum respects and includes basic rights of all users and providers, and includes private rights of content users and legal rights of all participators, such as content creators, content providers and service providers.

3. Get_Data Operation Using User Information

In a current TV-ANYTIME service, service agents perform a get_Data operation using special algorithms particular to agents on the basis of user metadata transmitted through the submit_Data operation, and transmit corresponding results to users.

As described above, a current TV-ANYTIME metadata server can collect user metadata, transmitted through the submit_Data operation, and can utilize the user metadata to generate statistics on the use of content, etc.

However, in order to provide customized service through a service agent connected to the server, there is a need to transmit non-anonymous user information, but the submit_Data operation, currently defined in TV-ANYTIME standards, basically enables the transmission only of anonymous data.

Therefore, in order to provide customized service, which is the intended purpose of TV-ANYTIME service, a method of searching for metadata suitable for a user by utilizing non-anonymous user information is urgently required.

SUMMARY OF THE INVENTION

Accordingly, the present invention has been made keeping in mind the above problems occurring in the prior art, and an object of the present invention is to provide a method of providing a user information-based search using a get_Data operation in TV-ANYTIME metadata service, which designates an element, indicating user information in a conventional get_Data operation, and requests that a user information-based search be conducted, thus allowing a client to selectively return metadata suitable for each user.

In order to accomplish the above object, the present invention provides a method of providing a user information-based search using a get_Data operation in TV-ANYTIME metadata service, comprising the steps of (a) adding a user information (PersonalInformation) element as an element of the get_Data operation, (b) receiving a request message of the get_Data operation, (c) extracting user information from the user information (PersonalInformation) element in response to reception of the request message, (d) conducting a user information-based search using the extracted user information; and (e) transmitting results of the user information-based search using a response message of the get_Data operation.

Preferably, in the user information-based search provision method, step (a) may comprise the step of (a-1) authenticating the user.

Preferably, in the user information-based search provision method, step (a-1) may be performed in a secure environment.

Preferably, in the user information-based search provision method, step (a) may comprise the step of (a-2) notifying the user that the user information (PersonalInformation) element is to be added.

Preferably, in the user information-based search provision method, step (d) may comprise the step of encrypting and managing the extracted user information (PersonalInformation).

Preferably, in the user information-based search provision method, the user information (PersonalInformation) element may be an extended user description type (ExtendedUserDescriptionType) element.

Preferably, in the user information-based search provision method, the user information (PersonalInformation) element may be a user description type (UserDescriptionType) element.

Preferably, in the user information-based search provision method, the get_Data operation may include an attribute (personalInfoUse) indicating whether user information is used.

BRIEF DESCRIPTION OF THE DRAWINGS

FIG. 3 is a view showing the request format of a conventional get_Data( ) operation;

FIG. 4 is a view showing an example of the type of RequestedTables returned as the results of a query in the conventional get_Data( ) operation;

FIG. 5 is a view showing the response format of the conventional get_Data( ) operation;

FIG. 6 is a view showing the request format and response format of a conventional submit_Data operation;

FIG. 7 is a view showing the request format of a get_Data operation according to the present invention; and FIG. 8 is a conceptual view showing the operation of the get_Data operation according to the present invention.

DESCRIPTION OF THE PREFERRED EMBODIMENTS

Figure 1:
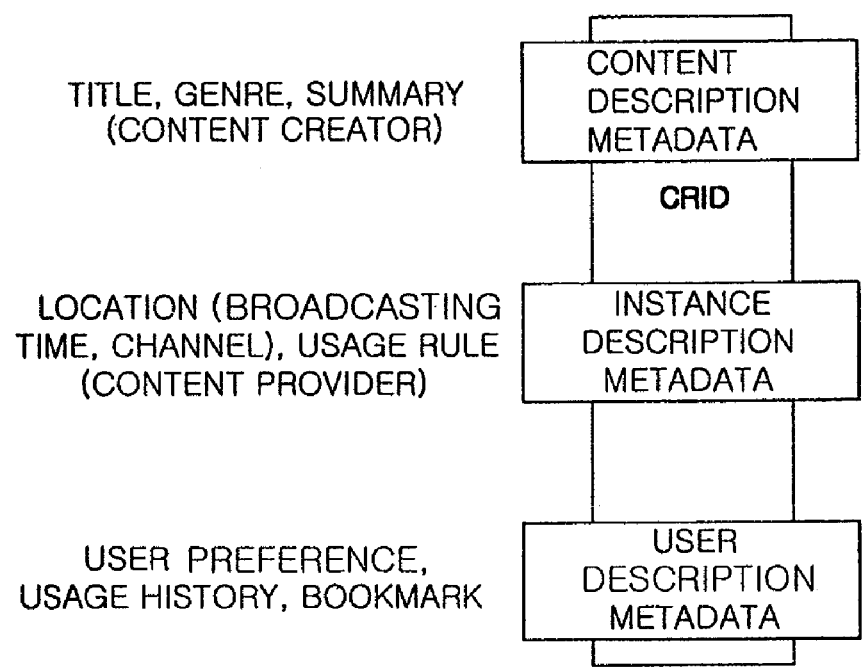
FIG. 1 is a view showing the configuration of TV-ANYTIME metadata.
Figure 2:
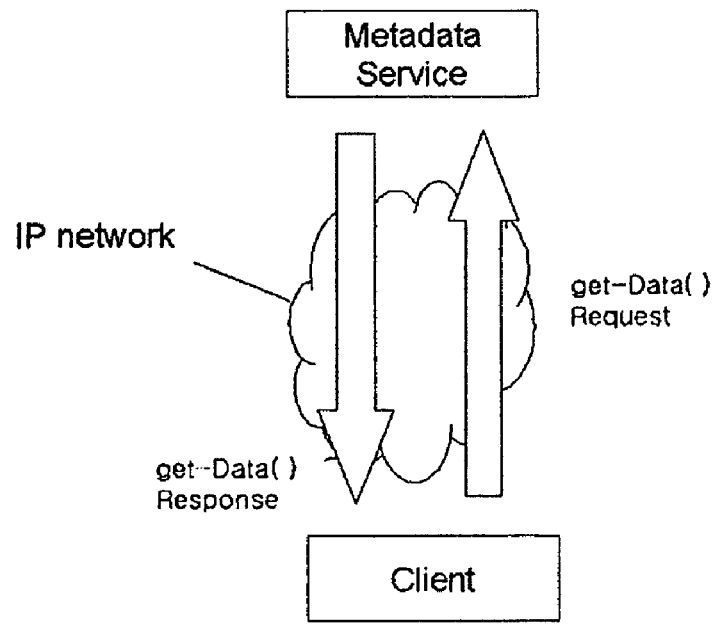
FIG. 2 is a conceptual view showing the typical execution of a get_Data( ) operation.

Hereinafter, embodiments of the present invention will be described in detail with reference to the attached drawings.

FIG. 7 is a view showing an example of the configuration of a get_Data operation according to an embodiment of the present invention.

As shown in FIG. 7, the get_Data operation according to the embodiment of the present invention includes an element (PersonalInformation) indicating user information.

The object of the get Data operation according to the embodiment of the present invention is to transmit an extended user description type (ExtendedUserDescriptionType) element in TV-ANYTIME service. The basic definition of the get_Data operation is the same as a conventional get_Data operation, but there is a difference therebetween with respect to the storage of non-anonymous information.

For example, a user logs in to corresponding service through an authentication procedure using his or her ID and/or password, and transmits user information using the get_Data operation. A service agent maintains and manages user information for each user, based on the received user information.

In detail, the get_Data operation allows a user to transmit user information having ExtendedUserDescriptionType, defined in TV-ANYTIME SP003-3. That is, the get_Data operation includes a user information (PersonalInformation) element having "tva2: ExtendedUserDescriptionType" defined in "Metadata Specification for Phase 2".

In the PersonalInformation element, since minOccurs="0" is set, the number of ExtendedUserDescriptionType elements included in the elements of the get_Data operation is equal to or greater than 0. Further, as an attribute of the get_Data operation, personalInfoUse is included.

The personalInfoUse attribute, which is a Boolean type, has a value of "true" or "false", and stores user information therein or indicates whether to conduct a search in consideration of user information, based on the user information (PersonalInformation) that is included in the get_Data operation. For example, if the personalInfoUse attribute is "true", a search is conducted in consideration of user information, whereas if the personalInfoUse attribute is "false", a search is conducted without taking user information into consideration. In this case, the personalInfoUse attribute allows a search to be conducted in consideration both of the user information stored in a service provider and of the user information obtained through the user information element (PersonalInformation). In this case, the user information (PersonalInformation) can be encrypted and managed.

Results of the execution of the get_Data operation are later transmitted to the client through a get_Data_Result element.

FIG. 8 is a conceptual view showing the operation of the get_Data operation according to an embodiment of the present invention.

Referring to FIG. 8, in TV-ANYTIME service, a client transmits the elements of the get_Data operation, including user information (PersonalInformation), to a service agent connected to a metadata service server through the Internet (IP network). In this case, the service agent must identify a user and notify the user of the transmission of user metadata in advance, depending on a user identification policy and a notification policy about the transmission of user information, which will be described later. Subsequently, the service agent can identify the element of the get_Data operation, extract user information from the corresponding PersonalInformation element, and transmit search results based on the user information through the above-described get_Data_Result element.

The get_Data operation is executed through the following policies.

1. User Identification

In order to correctly identify a user, the service agent must provide user registration and authentication procedures in a secure environment. For example, the user must be authenticated through a password, etc., and such a user identification procedure must be executed in a secure environment using a suitable encryption means.

2. Notification of Transmission of User Information

The service agent must sufficiently notify the user that user information thereof is to be transmitted. That is, there is a need to notify the user that the user information (PersonalInformation) element is to be included in the get_Data operation.

3. Management of User Information

The service agent must manage the leakage of user information to the outside and protect the user information using a method such as encryption. Further, when the user requests the deletion of and/or changes to user information, the service agent must perform a corresponding operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the get_Data operation of the present invention is configured so that a user transmits user information in the format of an ExtendedUserDescriptionType element defined in TV-ANYTIME SP003-3, but the get_Data operation can be configured in the format of a UserDescriptionType element. Therefore, the protection scope of the present invention is not limited to the above embodiments, but is determined by the accompanying claims.

As described above, the present invention is advantageous in that user information, transmitted through the get_Data operation of the present invention, can be processed as non-anonymous data in which a user can be identified and, thus, a service agent can provide customized service for each user, unlike the prior art, in which user metadata, transmitted through a conventional submit_Data operation defined in TV-ANYTIME SP006, is considered anonymous data.

What is claimed is:

1. A method of providing a user information-based search using a get_Data operation of a TV-ANYTIME metadata service, the method comprising:

(a) adding a user information element as an element of a request message of the get_Data operation;

(b) receiving at a TV-ANYTIME service providing apparatus the request message of the get_Data operation transmitted from a TV-ANYTIME service receiving apparatus;

(c) extracting information on a user of the TV-ANYTIME metadata service from the user information element in response to reception of the request message;

(d) conducting a user information-based search on program contents stored in the TV-ANYTIME service providing apparatus using the user information; and (e) transmitting a result of the user information-based search to the TV-ANYTIME service receiving apparatus using a response message of the get_Data operation, wherein the get_Data operation includes an attribute, which is a Boolean type value, indicating whether user information is used for searching program contents, wherein, in operation (d), if the Boolean type value is "true," the user information-based search is conducted using the user information, and if the Boolean type value is "false," the user information-based search is conducted without using the user information, wherein the request message of the get_Data operation is defined as follows:

```
<element name= "get Data" type= "tns:get_DataType"/>
    <complexType name="get_DataType">
        <sequence>
            <element name="ResourceID" type=
            "disco:ResourceIDType" minOccurs="0"/>
            <element name="QueryConstraints">
                <complexType>
                    <choice>
                        <element name="PredicateBag" type=
                        "tns:PredicateBagType"/>
                        <element name="BinaryPredicate"
                        type="tns:BinaryPredicateType"/>
                        <element name="UnaryPredicate"
                        type="tns:UnaryPredicateType/>
                    </choice>
                </complexType>
            </element>
            <element name="PersonalInformation" type=
            "tva2:ExtendedUserDescriptionType"
            minOccurs="0"/>
        </sequence>
        <attribute name="maxPrograms" type= "unsignedInt"/>
        <attribute name="personalInfoUse" type="boolean"
        default="true"/>
    </complexType>.
```

\* \* \* \* \*